// Patented Aug. 3, 1937

UNITED STATES PATENT OFFICE 2,088,869

ART OF IRRIGATING AND FERTILIZING SOIL

Herbert Henderson Porter, Clarendon, Va.

No Drawing. Application January 21, 1936, Serial No. 60,131

12 Claims. (Cl. 47—58)

This invention relates to the art of irrigating and fertilizing soils.

It is well known that soils differ in consistency both chemically and physically. Some soils are naturally acid while others are naturally alkaline. Some soils contain quantities of clay and iron matters which are converted by alkaline waters into diffusible colloid condition, and also the presence of alkalis in irrigating water in contact with soils containing silicic acid ions effects a conversion of the soil which often is harmful to plants being grown thereon. Diffusion of colloids often harms the plants as their roots suffer from lack of air, and the usual processes of nitrification cannot go on in proper form. Thus, even naturally acid soils may be harmed by alkaline waters: and alkaline soils are rendered more alkaline by the action of such waters. Furthermore, it has not heretofore been possible, by simple means, to correct the pH value of the soils to adapt them for particular crops, while at the same time furnishing the soils with proper and sufficient fertilizer value.

The copending application of William O. Sweek, Serial No. 731,972, filed June 22, 1934, now U. S. Letters Patent 2,028,172, in which the present applicant is a co-assignee, describes the irrigation and fertilization of soils by using the stored power of water for producing electricity, employing the electricity to fix nitrogen, introducing the fixed nitrogen into water, and using the power of the stored water also for moving the charged water to the soil. This method is particularly applicable for fixing the nitrogen by the electric arc method, and this leads ultimately to the formation of nitric acid ions in the water, so that a relatively alkaline water is at least in part acidified, and thus also alkaline soils in irrigation areas are prevented from "going back" from the effects of constantly employing water of excessive alkalinity for irrigation.

The electric arc method, however, has the difficulty of producing a ration of fertilizer which is proportioned to the acidifying or neutralizing effect, so that it is best applied to alkaline waters or for cultivating acid-manufacturing plants: and has the difficulty of demanding a large expenditure of energy (around 61,000 kilowatt hours per ton of fixed nitrogen) for the quantity of fertilizer produced.

The present invention proposes to employ the energy of the water for producing ammonia and for converting the same in part to nitric acid, and then to convey the nitrogen gases, as ammonium and nitric acid ions, to the soil by the irrigation water. By properly dosing the ammonia and nitric acid, a close control of the relative acidity or alkalinity may be effected, along with a proper proportioning of the relative pH value and of the nitrogenous fertilizer value independently of one another. Further, since irrigation projects are usually so arranged that quantities of electrical energy may be produced cheaply, it is particularly advantageous to use this energy also for producing the initial materials from which the ammonia is formed, and for effecting the necessary compressions and heatings of gases and gaseous mixtures for maintaining the through-put efficiency of the plant.

According to this invention, water is impounded by a dam, and then passed as usual through an energy convertor, such as a turbo-generator plant for producing electrical energy. The water from the turbine outfall is usually still above the level of the fields to be irrigated: or, if not, energy from the impounded water may be employed to raise a portion of the same to the necessary head for irrigation purposes.

This electrical energy is then employed in part as direct current for operating an electrolytic battery for producing hydrogen and oxygen from water in the usual way and by any suitable apparatus which permits collecting the separated gases.

A further part of this electrical energy is employed for working the compressors of an air-liquefaction plant, which may be of the Claude or Linde type; and is operated in conjunction with a still and arranged for counter-current flow of the hot compressed air with respect to the distilling liquid and gases. That is, the liquefied air is permitted to distill fractionally whereby the oxygen and nitrogen are separated and each is reheated substantially to atmospheric temperature before it is discharged. The quantity of energy demanded is therefore reduced, as the heat extracted from hot compressed gases is essentially recovered in restoring the separated gases to atmospheric temperature.

In conjunction therewith, the electrolytic plant may be operated to deliver a greater quantity of hydrogen than is required for conversion to ammonia, and this hydrogen (without preliminary drying, for example) may be mixed with air and the mixture burned to provide an increment of nitrogen. This nitrogen is then dried by successively passing over quick lime and calcium chloride or other hygroscopic matters which are later regenerated by heating by the electrical energy available.

Hydrogen from the electrolytic apparatus is dried and mixed with the dry nitrogen from the still and/or air burner and is then pumped through a heater and over a catalyst capable of combining the hydrogen and nitrogen to form ammonia. Such a catalyst may for example be iron oxide with promoters such as potassium and aluminum oxides mixed therewith. The percentage of ammonia formed is greater at lower temperatures such as 200 degrees C., but no large yield is formed. It is therefore preferred to operate at a temperature of around 450 degrees C., and up to 700 degrees C.; with a pressure of 100 to 900 atmospheres. The action is exothermic, and the temperature is preferably controlled by varying the velocity of the gases on their way through the catalyst. It is preferred to pass a relatively large volume, in order to keep the temperature at the desired point. For example, at a pressure of 300 atmospheres, and passing at a space velocity rate of 10,000 (i. e. the ratio of cubic feet of gas per cubic foot of catalyst), the efficiency of ammonia formation is around 25 per cent. This may be increased up to 100,000, but the preferable operating space velocity is around 20,000, under normal conditions.

As a result of this action, the effluent gases contain ammonia, nitrogen and hydrogen. They are passed through a trickle tower, in counter-current to a downward flow of circulating trickle liquid. This liquid is preferably some of the impounded water itself, particularly if this water is not too highly charged with alkali. The pressures are rapidly reduced, so that the equilibrium point remains fixed by drop of temperature of the expanding gases.

The gases from the trickle tower are again pumped back, with suitable drying, and re-introduced with fresh incoming gases, for a further catalytic action.

The trickle liquid may then be utilized directly for introduction into water of acid or neutral nature, and then passed on to the soil. This is a manner of operating when the present invention is used throughout the day.

If, however, the present plant is being operated during the night, to take advantage of off-peak loading on the generator equipment, then the trickle liquid may be re-circulated and stored until required, at which time it is dosed into the water passing to the soils, under similar conditions.

If the water is not highly alkaline, it is found that portions of the ammonia are oxidized during passage to the soil, and during the period prior to their acceptance by the plants.

It is, however, preferred to convert at least a part of the ammonia to nitric acid form. It is found possible to utilize a fertilizing mixture in which 60 per cent. of the nitrogen is in ammonia form, while the remaining 40 per cent. is present as a nitrate nitrogen.

For this purpose, the trickle liquors are preferably re-circulated through the tower until a strong solution of aqua ammonia is produced, which is intermittently passed into the still, and the still heated preferably by the electric energy. The ammonia is given off as a gas, and preferably after drying is then mixed with oxygen from the electrolytic cell and from the liquefaction-still apparatus, and usually with a further quantity of air. In order to convert all of the ammonia to nitric acid, it is necessary to provide more oxygen than is obtained from electrolyzing water to produce the necessary hydrogen and from the distillation of liquid air for producing the corresponding nitrogen. This deficit of oxygen may be obtained by introducing air, as stated, or by using excess hydrogen, as stated above, to burn out air in producing nitrogen. The oxygen corresponding to this excess hydrogen is therefore available for burning ammonia.

For burning the ammonia, the mixed vapors containing ammonia and oxygen are then pumped through a heater and through an oxidizing catalyst. The pressure employed controls the operation in part: and the temperature is preferably around 800 to 1,000 degrees C. As a catalyst, it is preferred to employ a fine mesh of platinum wire, heated electrically: this platinum is usable for long periods of time, as the operations do not lead to the introduction of any considerable poisons for the catalyst.

The effluent gases from the oxidizing catalyst comprise a mixture of ammonia, nitric oxide, nitrogen and oxygen. The nitric oxide soon oxidizes to the peroxide form with the excess oxygen. It may be pointed out that it is feasible to effect a control of the oxidation by limiting the oxygen supplied to the ammonia prior to its contact with the catalyst, and to introduce the remaining oxygen into the effluent gases from the catalyst. In this way, also, a proper dosing of ammonia and nitrogen oxide may be effected.

The effluent gases from the oxidizing catalyst are then passed into a trickle tower, or otherwise brought into contact with the water, or a portion of the water, to be utilized for irrigation. As a result of this action, the ammonia is dissolved in this water and a reaction also occurs between the nitrogen oxide gases which leads to the formation of nitric acid which also dissolves in the water, so that the water contains both ammonium and nitric acid ions. The oxide gas reaction leads to the production, usually, of a further quantity of nitric oxide, but this is in turn oxidized by contact with the air or excess oxygen present, and in turn forms the peroxide and a further quantity of nitric acid ions. To facilitate this reaction and re-oxidization, it is preferred to maintain the gases in contact with the water and with one another for a considerable time, and this may be effected by using an appropriate trickle tower or by passing the gases into the turbine infall or outfall.

Thus, by controlling the proportion of ammonia which is oxidized, by determining the temperature, velocity, and oxygen content present, an exact rationing of ammonia to nitric nitrogen may be effected in consonance with the relative alkalinity or acidity of the water or soil; while the actual fertilizing value may be increased or decreased irrespective of the acidifying or alkalizing effects of the excess of nitric acid or excess of ammonia respectively.

It is also possible to separate the ammonia from the effluent gases of the synthesizing catalyst chamber by cooling the gases, while still under pressure, below the critical point of the ammonia, and eliminating the ammonia from the nitrogen and hydrogen gases, which may then be returned in their mixture to the inlet of the catalyst chamber by a pump capable of compensating the pressure drop through the catalyst chamber and associated conduits. The ammonia passes from the eliminators to a receiver at a temperature of around 100 degrees C., and thence may be passed back through the gas cooler, to effect the cooling of hot gases from the synthesizing catalyst chamber, while the ammonia itself is heated and vaporized and then is permitted to flow through a further heater, after being mixed with the necessary quantity of oxygen as stated above, and thus into the oxidizing catalyst chamber.

It is particularly preferred to accomplish a partial oxidation of the ammonia, as water containing both ammonium and nitric acid ions is highly advantageous for fertilizing purposes. With alkaline soils and alkaline water, the conditions of oxidation are so maintained that the equilibrium point is closely approached, by providing excess of oxygen, using proper high temperatures, and thus assuring a high acidifying value of the gases.

According to the plants to be cultivated, different relative proportions of nitrogen fertilizer may be introduced, as pointed out in the aforesaid patent; and it will be noted that the present invention permits the control of acidity irrespective of the nitrogen content, within the limits of the acidifying powers which can be generated by the mixture of ammonia and nitrogen oxide gases at the operating equilibrium point.

It is obvious that the invention is likewise applicable in other instances where hydrogen and nitrogen are formed and combined, and then at least in part oxidized to provide a source of nitric acid ions for introduction into irrigating water. As set forth above, the energy of the impounded water is therefore also available for moving this charged water to the soil to be irrigated, in the usual ways. It is feasible to operate a small capacity plant throughout the day, and to store up the converted nitrogen as aqua ammonia and/or nitric acid, in ponds prepared for that purpose, and then to introduce these concentrated liquors, with appropriate prior conversion if necessary for the particular gas in determining the content of nitrogen and the acidifying values, in the water which is being passed down the flumes to the particular field. Thus, the content, both with respect to nitrogen and with respect to acidity, may be varied for different flumes and for the same flumes on different days.

As set out in the aforesaid patent, the delivery of the nitrogenated water is preferably interrupted at the beginning of the seeding or fruiting season; in order to assure proper fruiting or seeding of the plants. Since the present process lends itself to accurate proportioning of acidity or alkalinity, it is thus feasible to cultivate the crops with a maximum accuracy of satisfaction of nitrogen demand and by use of a water of proper pH value, by simple means and by employment of current which can be obtained cheaply at irrigation projects.

It is obvious that other changes may be made in the invention without departing from the scope of the appended claims.

I claim:

1. The method of irrigating which comprises storing water, employing energy of the stored water for generating electricity, employing the electricity for electrolyzing water to produce hydrogen, combining the hydrogen with nitrogen to produce ammonia, oxidizing the ammonia to nitrogen oxide and passing the products into water from the storage to form nitric acid, and moving the treated water for irrigation by energy of the storage head, while controlling the ration of nitric acid thus supplied according to the needs of plants and soil.

2. The method of irrigating which comprises producing ammonia, oxidizing a part of the ammonia to nitrogen oxide, passing the oxidation products into water, and utilizing the water for irrigation, while controlling the ration of nitric oxide and ammonia and the pH of the water according to the needs of plants and soil.

3. The method of irrigating which comprises producing ammonia, oxidizing a part of the ammonia to nitrogen oxide, passing the oxidized product and ammonia into water, and utilizing the water for irrigation, while controlling the ration of nitric oxide and ammonia and the pH of the water according to the needs of plants and soil.

4. The method of irrigating alkaline soils, which comprises producing ammonia, oxidizing the ammonia to nitrogen oxide, passing the oxidized product into water to effect a relative acidification of the water, and passing the treated water to the soil, while controlling the ration of nitrogen oxide and the pH of the water according to the needs of plants and soil.

5. The method of irrigating soil with originally alkaline water, which comprises producing ammonia, oxidizing the ammonia to nitrogen oxide, passing the oxidized product into water to reduce the alkalinity of the water, and passing the treated water to the soil, while controlling the ration of nitrogen oxide and the pH of the water according to the needs of plants and soil.

6. The method of irrigating alkaline soils with originally alkaline water, which comprises producing ammonia, partially oxidizing the ammonia to nitrogen oxide, passing the mixture of nitrogen gases into water to form an acid solution of ammonium nitrate, and passing the treated water to the soil, while controlling the ration of ammonium nitrate and the pH of the water according to the needs of the plants and soil.

7. The method of irrigating, which comprises storing water, employing energy of the water for generating electricity, employing the electricity for electrolyzing water to produce hydrogen and oxygen, fractionally separating air into nitrogen and oxygen, combining the hydrogen and nitrogen to form ammonia, oxidizing the ammonia by the oxygen produced in the electrolysis and separation to form nitrogen oxide, and utilizing the water for irrigation, while controlling the ration of nitrogen oxide and the pH of the water according to the needs of plants and soil.

8. The method of irrigating soils, which comprises storing water, employing energy of the water for generating electricity, employing the electricity for making ammonia and oxidizing the same to nitrogen oxide, passing a mixture of ammonia and nitrogen oxide into the water, and employing energy of the stored water for moving it to the soil, while controlling the ration of nitric oxide and ammonia and the pH of the water according to the needs of plants and soil.

9. The method of irrigating which comprises partially oxidizing ammonia to nitrogen oxide, passing the oxidation products into water, and utilizing the water for irrigation, while controlling the oxidizing step to determine the pH of the water and controlling the ration of treated water according to the needs of plants and soil for fertilization and relative acidity.

10. The method of irrigation which comprises storing water, employing energy of the water for generating electricity, employing the electricity for electrolyzing water to produce hydrogen and oxygen, burning the part of hydrogen with air and separating water whereby to produce nitrogen, combining another part of the hydrogen with the nitrogen to form ammonia, oxidizing the ammonia by the oxygen produced in the electrolysis to form nitrogen oxide, passing the nitrogen oxide into water and utilizing the treated water for irrigation, while controlling the ration of nitrogen oxide and the pH of the water according to the needs of plants and soil.

11. The method of irrigating which comprises storing water, employing energy of the water for generating electricity, employing the electricity for producing ammonia, passing the products into a circulating stream of water to successively increase the percentage of ammonia therein, withdrawing a part of the ammonia from the stream and oxidizing a part thereof to form nitrogen oxide while controlling the ratio of ammonia and nitrogen oxide in the effluent, passing the effluent into water, and utilizing the treated water for irrigation while controlling the ration of nitrogen compounds therein to the needs of plants and soil, the control of the ratio of ammonia and nitrogen oxide being employed to determine a substantially optimum pH of the treated water for the desired ratio of nitrogen compounds.

12. The method of irrigating which comprises producing ammonia, oxidizing a part of the ammonia to nitrogen oxide, passing the oxidation products into water, storing the treated water, and introducing the same into admixture with other water and utilizing the admixture for irrigation, the proportion of the ammonia oxidized being controlled for determining the desired pH value in the treated water and the proportion of treated water in the admixture being controlled for also determining the desired pH and the desired ration of fixed nitrogen therein according to the needs of plants and soil.

HERBERT H. PORTER.